United States Patent Office 2,895,294
Patented July 21, 1959

2,895,294

CONTROL SYSTEM FOR GAS TURBINE INSTALLATIONS

Basil Joseph Terrell, Monkseaton, England, assignor to The Parsons and Marine Engineering Turbine Research and Development Association, Wallsend, England Application February 4, 1955, Serial No. 486,232

Claims priority, application Great Britain July 22, 1954

2 Claims. (Cl. 60—39.16)

This invention relates to gas turbine installations of the kind in which the cycle includes a separate output turbine, such installations being particularly suitable for marine propulsion or for other automotive applications where rapid manoeuvering is necessary or desirable.

In such installations it has been customary to provide a controllable by-pass round the separate output turbine so arranged that when the by-pass is open the gas flows round the turbine instead of through it and the turbine ceases to produce power. An effect of this by-pass, however, is to reduce the pressure drop across the turbine and this will naturally influence the remainder of the cycle (that is, the gas generator portion) necessitating adjustments in fuel supply to the compressor turbine or turbines with consequent rapid temperature variations.

In application Serial No. 280,700, now Patent No. 2,755,621, means are described for obviating this drawback comprising a change-over valve so connected that with the change-over valve in one position the gas flows through the output turbine in the normal manner while with the valve in the other position the gas is cut off from the turbine and flows through an orifice of such a size as to produce the same pressure drop as that produced across the turbine under the same conditions of mass flow and inlet temperature.

Such means can only be used for changes from full power to zero and vice versa and the object of the present invention is to enable such installations to be operated at any fraction of full power.

The invention consists in a gas turbine installation of the kind referred to wherein exhaust gases from a compressor-driving turbine are passed to the inlet of the output turbine by way of a connection containing a valve and a by-pass connection for a heat exchanger is provided also containing a valve linked to said former valve and wherein a by-pass connection is provided across said heat exchanger containing a finite orifice and a two-position valve shut at full power and fully open at all other powers whereby for all turbine outputs from zero to full power the combined flow through the turbine and by-pass connection remains constant with constant pressure ratio.

The invention also consists in a gas turbine installation as set forth in the preceding paragraph, wherein said two-position valve is linked with the two first-mentioned valves.

The invention also consists in gas turbine installations substantially as hereinafter described and as shown in the accompanying diagram.

Figure 1:
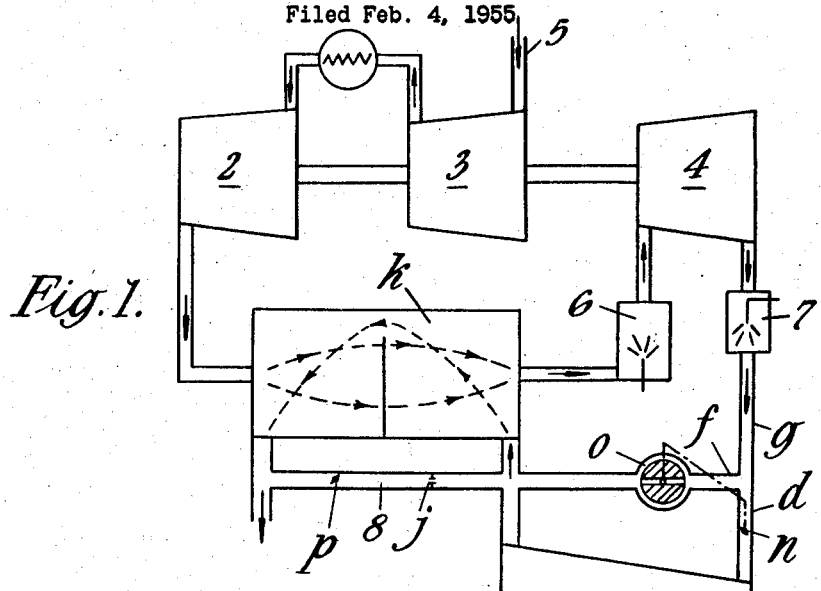

Figure 1 of the accompanying diagrams illustrates one convenient application of the present invention.

Figure 2:
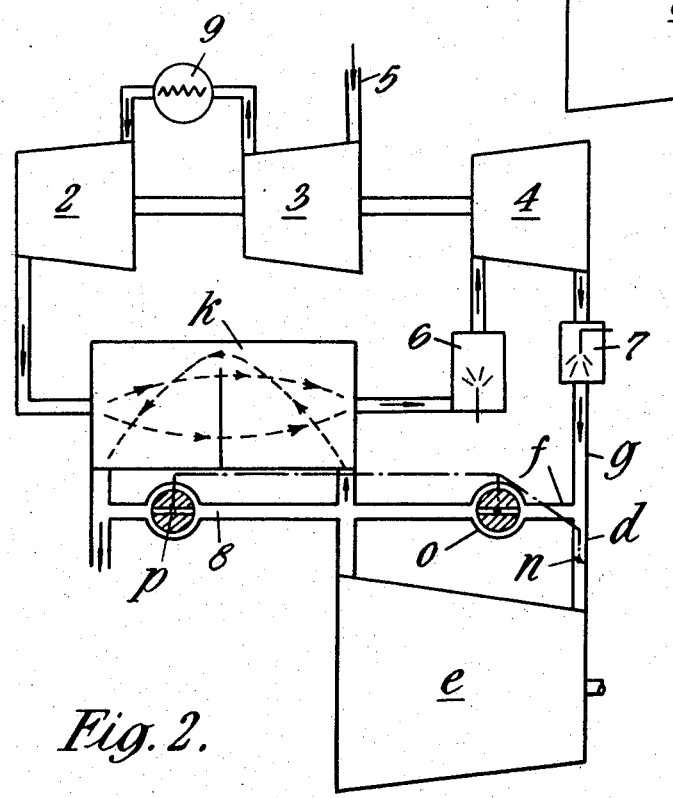

Figure 2 illustrates a second application of the present invention.

In accordance with Figure 1, a high-pressure compressor 2 and a low-pressure compressor 3 are driven by a high-pressure turbine 4. Air enters at 5, is compressed in 3 and after being cooled in an intercooler 9 is further compressed in 2. It then passes by way of a heat exchanger $k$ to a combustion chamber 6 feeding the turbine 4.

The exhaust gases from the turbine 4 pass by way of a reheat combustion chamber 7 and pipe $g$ to two pipes $f$ and $d$ in parallel. The branch $d$ contains a butterfly valve $n$ and the by-pass $f$ includes a valve $o$. The valve $o$ is mechanically linked to valve $n$ so that when the valve $n$ is operated in the closing sense the valve $o$ operates in the opening sense. The flow spaces in valve $o$ are so designed that a reduction in flow through the pipe $d$ due to operating valve $n$ in the closing sense is accompanied by an equal increase in flow through the pipe $f$ while the pressure ratio across the turbine $e$ is maintained constant. The reverse process occurs when valve $n$ is operated in the opening sense. With a constant pressure ratio, therefore, the combined flow through pipes $d$ and $f$ and the pressure ratio across the turbine $e$ remain constant for all positions of the valve $n$ between shut and fully open and therefore for all outputs of the turbine $e$ between zero and full power.

The pressure ratio remains constant if all components of the engine except the output turbine $e$ are unaffected by changes in output, and this is ensured by causing a fraction of the combined flow from turbine $e$ and pipe $f$ to by-pass the heat exchanger $k$ through the by-pass 8 at all outputs other than full power. The quantity of gas flowing through the by-pass 8 is controlled by a valve $p$ such that although the temperature of the combined flow of gases from turbine $e$ and pipe $f$ increases as output is reduced, the rate of heat exchange in the heat exchanger $k$ remains unchanged.

The valve $p$ can either be mechanically linked with the valves $n$ and $o$ to give an automatically controlled variation of opening throughout the power range, or it can be controlled independently of valves $n$ and $o$. In the latter case, the valve $p$ would normally be shut at full power and opened to any required extent at all other powers.

In the case where valve $p$ is mechanically linked with valves $n$ and $o$ as shown in Figure 2, the flow spaces in valve $p$ are so designed that when the valve $n$ is operated in the closing sense the valve $p$ operates in the opening sense, increasing the flow through the by-pass 8 and decreasing the flow through the heat exchanger $k$ such that the rate of heat exchange remains unchanged. The reverse process occurs when the valve $n$ is operated in the opening sense. With a constant pressure ratio, therefore, the rate of heat exchange remains unchanged for all positions of the valve $n$ between shut and fully open and therefore for all outputs between zero and full power.

I claim:

1. A gas turbine installation of the kind referred to wherein exhaust gases from a compressor-driving turbine are passed to the inlet of the output turbine by way of a connection containing a valve, a by-pass connection for said output turbine being provided also containing a valve linked to said former valve, the output turbine being followed by a heat exchanger, a by-pass connection being provided across said heat exchanger characterized by the provision of a valve in said heat exchanger by-pass connections operable for all output turbine loads from zero to full power in order to maintain the rate of heat transfer in the heat exchanger substantially constant for all positions of said valves.

2. A gas turbine installation of the kind referred to wherein exhaust gases from a compressor-driving turbine are passed to the inlet of the output turbine by way of a connection containing a valve, a by-pass connection for said output turbine being provided also containing a valve linked to said former valve, the output turbine being followed by a heat exchanger, a by-pass connection being provided across said heat exchanger and a valve in said heat exchanger by-pass connection, said last-mentioned valve being linked to said former valves so as to be closed under full power conditions but opened for all outlet turbine loads from zero to full power in order to maintain the rate of heat transfer in the heat exchanger substantially constant for all positions of said valves.

References Cited in the file of this patent

UNITED STATES PATENTS

| | | |
|---|---|---|
| 2,654,217 | Rettaliata | Oct. 6, 1953 |
| 2,755,621 | Terrell | July 24, 1956 |